United States Patent
Krishnamurthy et al.

(10) Patent No.: US 9,025,461 B2
(45) Date of Patent: May 5, 2015

(54) POWER OPTIMIZED BEHAVIOR IN MESH NETWORKS

(75) Inventors: Srilekha Krishnamurthy, San Diego, CA (US); Can Erkin Acar, San Diego, CA (US); Ge Wang, San Diego, CA (US); Indranil Banerjee, San Diego, CA (US); Dmitry Beransky, San Diego, CA (US); Deepti Mani, Hyderabad (IN); Nidish R. Kamath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/564,648

(22) Filed: Aug. 1, 2012

(65) Prior Publication Data

US 2014/0036683 A1   Feb. 6, 2014

(51) Int. Cl.
| | |
|---|---|
| *H04L 1/00* | (2006.01) |
| *H04W 40/10* | (2009.01) |
| *H04W 40/26* | (2009.01) |
| *H04W 84/18* | (2009.01) |

(52) U.S. Cl.
CPC .............. *H04W 40/10* (2013.01); *H04W 40/26* (2013.01); *H04W 84/18* (2013.01); *Y02B 60/42* (2013.01); *Y02B 60/50* (2013.01)

(58) Field of Classification Search
USPC ........................................................ 370/236
See application file for complete search history.

(56) References Cited

U.S. PATENT DOCUMENTS

| | | | | |
|---|---|---|---|---|
| 7,151,769 | B2 * | 12/2006 | Stanforth et al. ............. | 370/351 |
| 7,519,351 | B2 | 4/2009 | Malone, III | |
| 7,830,305 | B2 | 11/2010 | Boling et al. | |
| 2001/0034223 | A1 | 10/2001 | Rieser et al. | |
| 2005/0169257 | A1 * | 8/2005 | Lahetkangas et al. ........ | 370/389 |
| 2006/0002303 | A1 | 1/2006 | Bejerano et al. | |
| 2007/0060097 | A1 | 3/2007 | Edge et al. | |
| 2009/0010189 | A1 | 1/2009 | Nagra et al. | |
| 2009/0022116 | A1 * | 1/2009 | Walley et al. .................. | 370/338 |
| 2010/0085948 | A1 * | 4/2010 | Yu et al. ......................... | 370/338 |
| 2010/0279647 | A1 | 11/2010 | Jacobs et al. | |
| 2011/0116402 | A1 * | 5/2011 | Kimura .......................... | 370/252 |
| 2013/0028104 | A1 * | 1/2013 | Hui et al. ....................... | 370/252 |

OTHER PUBLICATIONS

International Search Report and Written Opinion—PCT/US2013/052731—ISA/EPO—Dec. 10, 2013.

* cited by examiner

*Primary Examiner* — Andrew Lai
*Assistant Examiner* — Jamaal Henson
(74) *Attorney, Agent, or Firm* — Jeffrey D. Jacobs

(57) ABSTRACT

Mesh communications aspects are disclosed in which multiple mobile devices located within a communication area perform direct communication to establish a mesh network. Each device node included in the mesh network provides power profile information to the other nodes on the network. As mesh messages are generated for transmission by the nodes onto the mesh network, an adaptive routing mechanism determines the transmission route based on the power profile of the proposed target node. The selective and adaptive routing determination allows for power to be efficiently conserved within the mesh network.

48 Claims, 6 Drawing Sheets

POWER OPTIMIZED BEHAVIOR IN MESH NETWORKS

BACKGROUND

1. Field

Aspects of the present disclosure relate generally to wireless communication systems, and more particularly, to power optimized behavior in mesh networks.

2. Background

With the increased functionality of modern wireless communication devices, much time is devoted to implementing power conserving mechanisms to increase the life of the battery or portable energy source for such devices. During emergency situations, such as hurricanes, earthquakes, terrorist attacks, and the like, cellular infrastructure is typically overwhelmed with too many users attempting access to the network at the same time. The overflow of access attempts not only causes failed user connections, but may also prevent emergency response personnel or public safety agencies from having critical access to communications, both for initiating communications and receiving communications and information from the emergency victims.

Various solutions have been attempted to relieve or accommodate the problems that arise in such situations. However, it would be beneficial to implement efficient and practical improvements to such emergency situation communication solutions.

SUMMARY

Various aspects of the present disclosure are directed to wireless communication systems in which multiple mobile devices located within an selected communication area perform direct communication to establish a mesh network. Each device node that is included in the mesh network provides power profile information to the other nodes on the network. As mesh messages are generated for transmission by the nodes onto the mesh network, an adaptive routing mechanism determines the transmission route based on the power profile of the proposed target node. By selectively and adaptively determining the transmission routing, each of the nodes in the mesh network may intelligently conserve power usage to maximize the health and duration of the network.

In maintaining the mesh network, if a node with a stronger power profile enters the communication area, the other nodes in the network may adaptively and dynamically change transmission routing decisions to consider the new node. Conversely, if the power profile of any particular node falls, the other nodes in the mesh will adjust transmission routing decisions accordingly. With changing power profiles, when mobile devices encounter two or more potential mesh network nodes with the same or similar power profiles, the device may use random selection procedures for transmission route selections in order to maintain fairness in the distribution. The adaptive nature of the mesh allows the member nodes to adjust its transmission route selections based on the changing power profiles of the mesh nodes in addition to new nodes or existing nodes that may no longer be available.

Additional aspects of the present disclosure are directed to a method of wireless communication that includes establishing a mesh network with one or more wireless communication entities in a communication zone of a wireless communication network, generating, at a mobile device, at least one mesh message, determining, by the mobile device, a transmission route for a target node of the one or more wireless communication entities, wherein the transmission route is determined based on a power profile of the target node, and transmitting the mesh message from the mobile device to the target node using the determined transmission route.

Further aspects of the present disclosure are directed to a computer program product that includes a non-transitory computer-readable medium. The non-transitory computer-readable medium includes code to establish a mesh network with one or more wireless communication entities in a communication zone of a wireless communication network, code to generate, at a mobile device, at least one mesh message, code to determine, by the mobile device, a transmission route for a target node of the one or more wireless communication entities, wherein the transmission route is determined based on a power profile of the target node, and code to transmit the mesh message from the mobile device to the target node using the determined transmission route.

Still further aspects of the present disclosure are directed to an apparatus for wireless communication that includes means for establishing a mesh network with one or more wireless communication entities in a communication zone of a wireless communication network, means for generating, at a mobile device, at least one mesh message, means for determining, by the mobile device, a transmission route for a target node of the one or more wireless communication entities, wherein the transmission route is determined based on a power profile of the target node, and means for transmitting the mesh message from the mobile device to the target node using the determined transmission route.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In one practical application of various aspects of the present disclosure, communication during emergency situations may be addressed. Various ideas have been attempted to minimize or reduce communication issues that occur in emergency situations, such as by prioritizing communication traffic and even bringing in temporary, mobile access point resources, such as through emergency-related rapid response mobile communications apparatuses, such as cell-on-light-trucks (COLTs) and cell-on-wheels (COWs). On the user side, solutions have been suggested that would form ad hoc emergency mesh networks in an emergency zone to ensure communication between individuals located within the emergency zone.

Figure 1A:
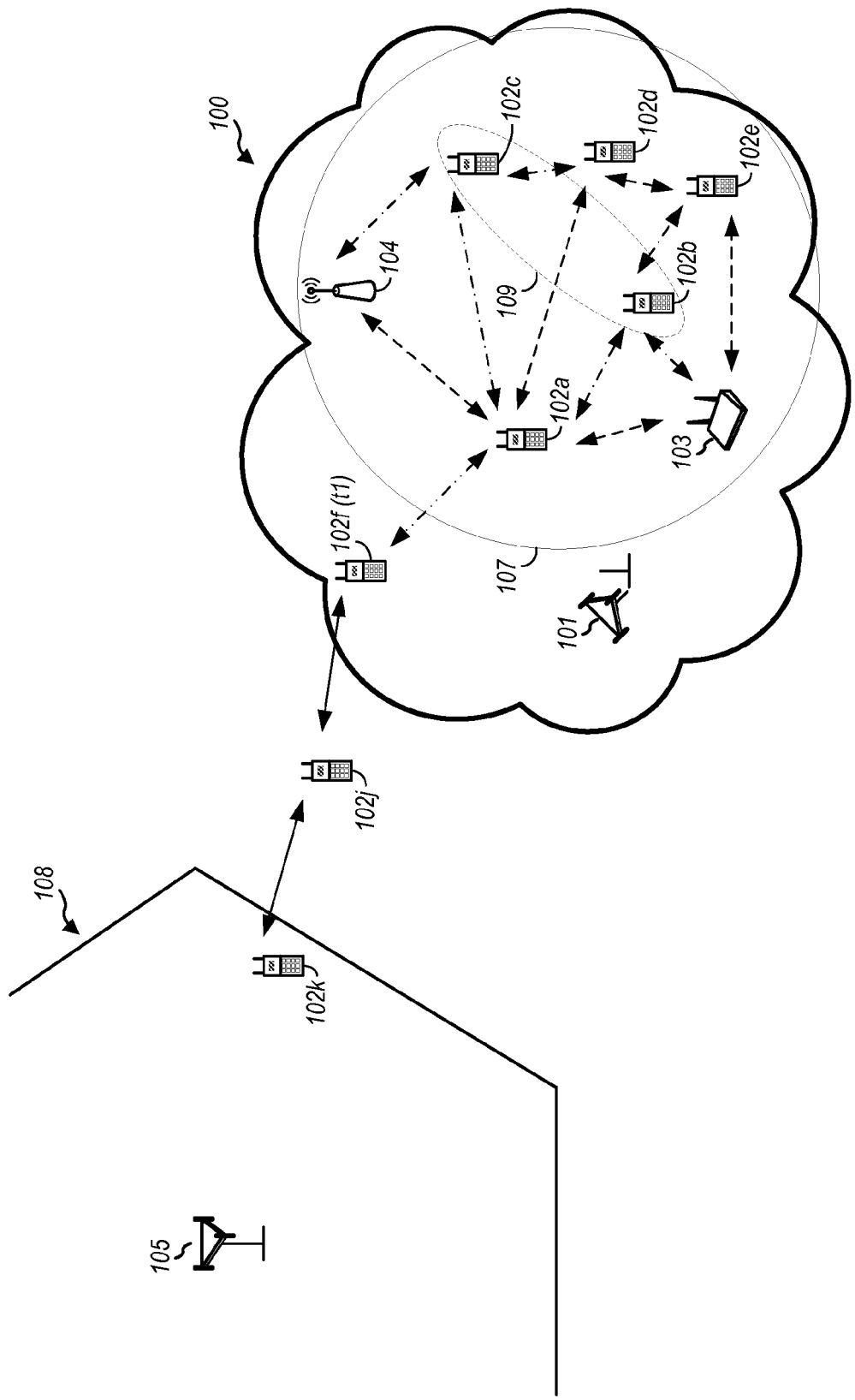
FIGS. 1A-1C are block diagrams illustrating an example communications system configured according to one aspect of the present disclosure.

FIG. 1A is a block diagram illustrating an example communications system configured according to one aspect of the present disclosure. FIG. 1 illustrates an emergency zone 100 that identifies a location of a recent emergency at a time, t1. The emergency may be an earthquake, a terrorist attack, a tornado, a hurricane, or the like. Emergency zone 100 represents the area in which the emergency has affected communications. Base station 101 provides an access point for wireless wide area network (WWAN) communication for various compatible mobile devices within its coverage area. WWAN communications include technologies such as Global System for Mobile Communications (GSM), Long Term Evolution (LTE), and the like. As a result of the emergency, base station 101 is rendered inoperable. Base station 101 may be inoperable for a number of reasons, including physical destruction or damage, power failure, or simply extremely overloaded capacity. As a result of the inoperability of base station 101, none of the mobile devices within its coverage area may establish WWAN communications.

Mobile devices 102a-e were located with their users within emergency zone 100 during the emergency. Each of mobile devices 102a-e are not only equipped with WWAN radios and components for WWAN communications, but are also equipped with wireless local area network (WLAN) radios and components to facilitate WLAN communication, such as to connect wirelessly to the Internet, networks, other mobile devices, and the like. WLAN communications include BLUETOOTH®, BLUETOOTH® Low Energy (LE), WIFI™ (standardized through IEEE 802.11), WIFI DIRECT™, ZIGBEE™, and the like. When an emergency situation is determined by the mobile devices 102a-e, each device begins an emergency mode of operation that attempts to establish an emergency mesh network 107 with other WLAN-capable devices within range. Mobile device 102a begins to transmit signals to establish an ad hoc communication link with other mobile devices within its WLAN radio range, such as mobile devices 102b, 102c, and 102d. Each other such mobile device 102b-e also transmits signals establishing ad hoc communication links with the other proximate mobile devices. The various connections between mobile devices 102a-e are used to form an emergency mesh network 107. Mobile devices 102a-e may also attempt communication with WLAN access points, such as WIFI™ access point 103, and access point 104. These WLAN access points may be used to route emergency messages or emergency beacons to other devices in emergency mesh network 107.

As emergency mesh network 107 is established, mobile devices 102a-e may transmit various types of emergency messages or beacons, depending on the configuration of the emergency communication system. In one aspect, emergency beacons may be transmitted by each mobile device in emergency mesh network 107. The emergency beacon may include vital information, such as a unique user identifier (ID), timestamp, location, condition of the user (obtained through various existing sensors already built into many smart mobile devices), and the like. User-defined messages may also be transmitted as emergency messages via mobile devices located in the emergency zone 100. The various emergency messages and beacons may also be prioritized, such that when communication is restricted for some reason, higher-priority messages will be given preference.

Because of the dynamic nature of an emergency situation, adaptive routing protocols, such as routing information protocol (RIP), open shortest path first (OSPF), and the like, may be implemented in the ad hoc emergency mesh networks of the various aspects. Unlike routing schemes for typical networks, an emergency mesh network offers unique circumstances that should be taken into consideration when determining the routing scheme. In an emergency situation, some users may be trapped or injured. These trapped or injured users may be isolated from emergency personnel, who may not be able to reach the trapped or injured users for hours or even days. Thus, preserving the information in the emergency beacons or messages of these isolated users is an important consideration. Power consumption is one of the important parameters that will determine how long such information can be preserved. Accordingly, various aspects of the present disclosure provide for adaptive routing schemes that consider the power profile of mobile device nodes in the emergency mesh network when making routing decisions.

The power profile of a given mobile device may be calculated or obtained through consideration of multiple variables and factors present in the environment around the mobile device. For example, the power profile may be based on remaining battery life, the average power consumed in routing a single message, and the like. Additional factors may also be included in the calculation, such as available radio interfaces for transmission, the bandwidth and power characteristics of those available radio interfaces, proximity to the next message hop or leg, the size of the data to be transmitted, and the like. The power profile for a mobile device configured according to the various aspects of the present disclosure may be determined based on any one or combination of these factors.

Referring back to FIG. 1A, in the ad hoc emergency mesh network 107 of mobile devices 102a-e, the routing scheme according to the various aspects of the present disclosure would provide edge weights that were based on the power profile of the particular mobile device. For example, in considering routing a message from mobile device 102b to mobile device 102a, the weight associated with the edge (mobile device 102a, mobile device 102b) will be some function of the power profile, P, of mobile device 102a. As noted above, the power profile may include the remaining battery power, the average power consumed in routing a single message, and the like. Mobile device 102b may also route a message to mobile device 102e. In determining which mobile device to route the message to, mobile device 102b may compare the edge weight of edge (mobile device 102a, mobile device 102b) with the edge weight of edge (mobile device 102e, mobile device 102b). If the power profile of mobile device 102e is low compared to that of mobile device 102a, mobile device 102b may determine to route the message to mobile device 102a over routing to mobile device 102e. In selected aspects of the present disclosure, if mobile devices 102e and 102a have an equivalent or similar power profile, mobile device 102e may use a random selection process in order to ensure fair distribution, as is known in the art.

It should be noted that for situations in which the mobile devices 102e and 102a have an equivalent or similar power profile, any number of different methods or means may be used to select the route for the message. A random selection process, as noted above, is merely one example. Other examples include a round robin scheme, a weighted selection based on the power profiles of other devices surrounding mobile devices 102e and 102a, type of device, or the like. The various aspects of the present disclosure are not limited to a particular method for selecting between routes having equivalent or similar power profiles.

Selecting the route having the higher edge weight may conserve the power of mobile device 102e. Conserving the power would allow mobile device 102e to operate longer and, thus, provide an opportunity for the emergency messages and beacons from mobile device 102e to be broadcast longer. In some aspects, the adaptive routing scheme may select the mobile device having the lower power profile. For example, consider that mobile device 102a, has the highest power profile in emergency mesh network 107. If all other mobile devices, such as mobile devices 102b, 102c, 102d, WIFI™ access point 104, and access point 103, transmit emergency messages and beacons to mobile device 102a for forwarding or attempted forwarding to devices or access points outside of emergency zone 100, the power of mobile device 102a would be drained quickly and, perhaps, too quickly. As such, the adaptive routing scheme bases the routing decision, at least in part, on the power profile of the members of emergency mesh network 107. However, the decision is not simply to choose the route with the highest power profile.

In addition to the mobile devices that are isolated within emergency zone 100, additional mobile devices may enter emergency zone 100 after the emergency event. These transient mobile devices, such as mobile device 102f, may temporarily join emergency mesh network 107 as they enter into emergency zone 100 and begin receiving emergency messages and beacons from other mobile devices of emergency mesh network 107. Prior to the arrival of mobile device 102f, emergency messages and beacons are generated and communicated by each of mobile devices 102a-e within emergency mesh network 107. Depending on the power profile of each mobile device, the number of transmissions from each mobile device may vary. For example, with a high power profile, a mobile device, such as mobile device 102a, may transmit its emergency beacon at a given periodic rate, while a mobile device with a low power profile, such as mobile device 102c, may only transmit its emergency beacon at a rate that is a fraction of the rate at which mobile device 102a transmits its emergency beacon. Additionally, should the power profile of mobile device 102a fall, it may adjust its transmission rate to a lower rate to accommodate the reduced power characteristic. The emergency messages or beacons from each of mobile devices 102a-e are stored and forwarded by each other of the mobile devices in emergency mesh network 107. Thus, each member node of emergency mesh network 107 would have record of the emergency message or beacon of every other mobile device in emergency mesh network 107.

It should be noted that in various aspects of the present disclosure, as the power profile of any one or more mobile devices begins to get low, the adaptive routing scheme operating within each of the mobile devices may also begin to vary the "relaying" behavior of the mobile device as a function of the power profile. For example, relaying behavior includes storing received emergency beacons or messages, forwarding the received emergency beacons or messages, advertising to the other nodes in the mesh network availability as an intermediate node, and the like. As a result, the mobile device may act in a self-preservation mode by discarding any low priority emergency beacons if its power profile reaches a certain lower threshold.

It should further be noted that mobile devices may transmit different priority messages at different rates. For example, a regular mesh message may be transmitted at a lower rate than a high-priority message, such as an emergency message. Additionally, in very congested situations, lower priority messages may even be dropped entirely.

As mobile device 102f enters emergency zone 100, it begins receiving the emergency messages and beacons from mobile device 102a, which is the only mobile device currently within emergency mesh network 107 in range of mobile device 102f. The signals received at mobile device 102f prompt mobile device 102f to join emergency mesh network 107 by transmitting its own emergency beacon or message into emergency mesh network 107 through mobile device 102a. In addition to being part of emergency mesh network 107, mobile device 102f is within WLAN range of mobile device 102j, which is outside of emergency zone 100. Mobile device 102j is, itself, within WLAN range of mobile device 102k. Mobile device 102k is located in coverage area 108 of base station 105. Base station 105 is fully operable. Mobile device 102f, after receiving emergency messages and beacons from emergency mesh network 107, transmits the messages and beacons to mobile device 102j over WLAN, and mobile device 102j transmits those emergency messages and beacons to mobile device 102k. Once mobile device 102k receives these messages, it may deliver the messages to the emergency service the messages are directed to via WWAN communications through base station 105.

In additional aspects of the present disclosure, emergency mesh network 107 may be partitioned into multiple domains of devices. The formation of any individual domain may be based on a number of different criteria, such as device type, collective health of devices, power profile, and the like. The health of a domain may be a metric based on a number of parameters. For example, the health metric may be determined based on the average remaining power of the devices in the domain, the average power consumed by devices in a domain to transmit a single message, the intra-domain connectivity, the inter-domain connectivity, and the different radio interfaces that are present in the domain (e.g., WIFI™, BLUETOOTH™, and the like). Intra-domain connectivity is measured based on the k-connectivity of the set of nodes in the domain, for some sufficiently large value k. This intra-domain connectivity may be an indication of mesh stability. Moreover, if a particular domain has many transmission routes to an outside accessible network, such as the Internet or other WAN, the health of the domain may be seen as higher than that of an isolated domain.

Inter-domain connectivity is determined by the amount of communication occurring between different domains. Inter-domain routing policies are used in conducting the inter-domain communication. The adaptive routing scheme configured for the aspect that partitions emergency mesh network 107 into multiple domains may take into account the inter-domain routing policies, such as the restriction against routing High Priority emergency messages or beacons through domains with a health less than a predetermined threshold.

Referring again to FIG. 1A, two of the mobile devices in emergency zone 100, mobile devices 102b and 102c, each have a low health metric based on low remaining power for each device and a higher average power consumption used to transmit a single message. Thus, when forming emergency mesh network 107, a partition is created that includes mobile devices 102b and 102c in domain 109. The remaining devices, mobile devices 102a, d, e, and f, and WIFI™ access point 103, and access point 104, make up another domain within emergency mesh network 107. Similar to the aspect described without partitioning emergency mesh network 107 into multiple domains, the adaptive routing scheme for inter-domain routing are weighted as a function of the health of the receiving domain. For example, when considering the routing of a message from the first domain including mobile station 102a, to domain 109, mobile station 102a will consider the overall health of domain 109.

Figure 1B:
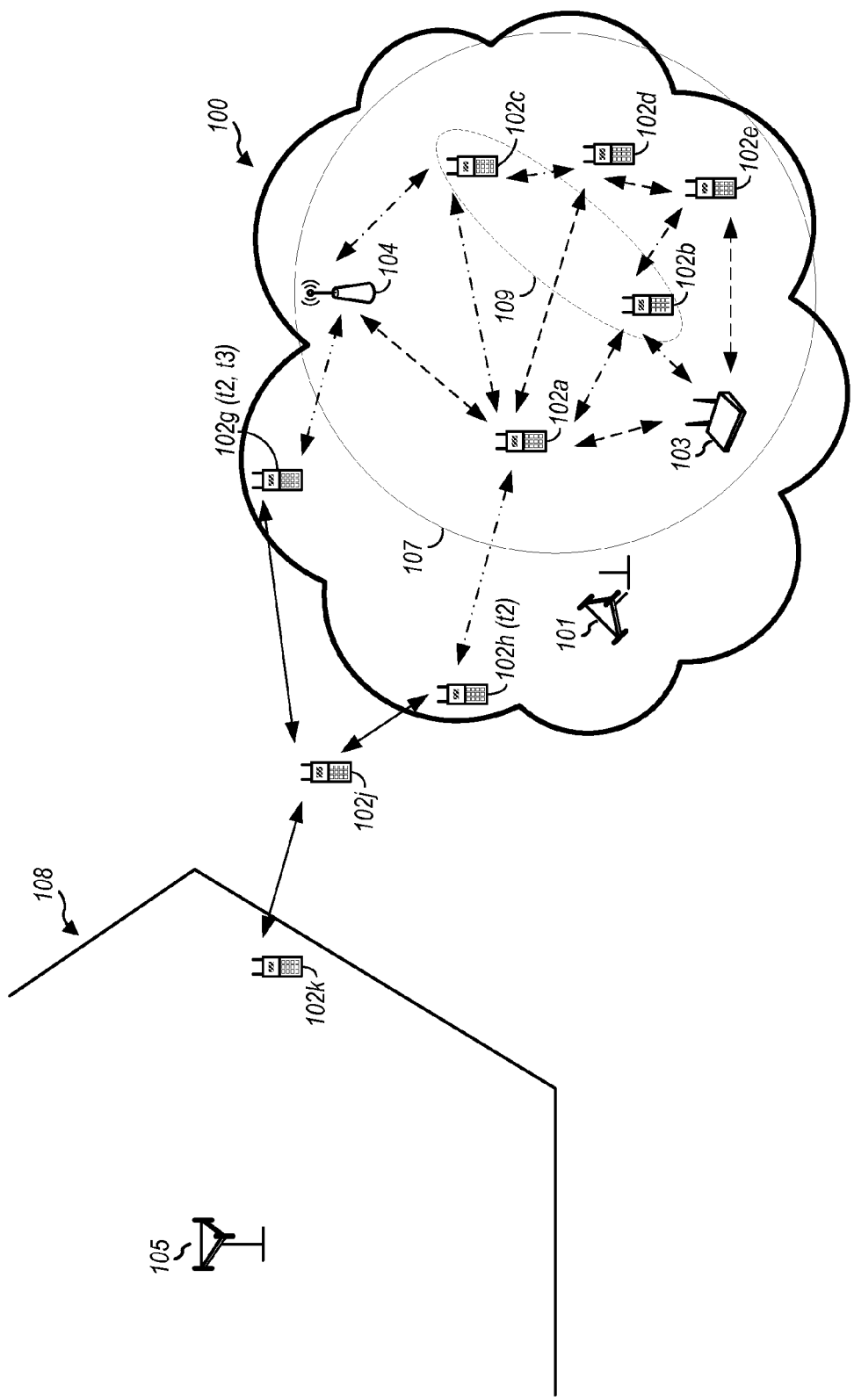

FIG. 1B is a block diagram illustrating the example communications system at a time, t2, after the emergency event.

The user with mobile device 102f moved out of emergency zone 100 and, therefore, has left the domain of mobile devices 102a, d, e, and WIFI™ access point 103, and access point 104. Two new users with mobile devices 102g and h, respectively, now enter emergency zone 100. As each of mobile devices 102g and h begin to receive the emergency messages and beacons from emergency mesh network 107, each are evaluated and added to a respective domain. With a higher remaining battery power and efficient transmitter, mobile device 102g is added to the domain of mobile devices 102a, d, e, and WIFI™ access point 103, and access point 104. Mobile device 102h has a much lower remaining battery power and is, therefore, added to domain 109 with mobile devices 102b and c.

Both of the new mobile devices, mobile devices 102g and h, are within WLAN range of mobile device 102j, located outside of emergency zone 100 and accessible to the WWAN communication of base station 105, through mobile device 102k located within coverage area 108 of base station 105. Therefore, emergency messages or beacons received by either of mobile devices 102g and h may be forwarded to the ultimate addressee emergency service.

In an aspect of the present disclosure, the rate at which each node within emergency mesh network 107 transmits an emergency beacon may vary based on its power profile, such as its remaining battery power. For example, as time passes to t2, mobile device 102a begins to lose battery power. The level is still sufficient to maintain mobile device 102a within its domain. However, considerations begin to be made in transmitting its emergency beacon with the falling battery power. At time, t2, mobile device 102a drops its emergency beacon transmission rate from 20 times per minute to 10 times per minute, as its remaining battery power falls to less than 60% of maximum. The determination of transmission rates may be made according to the following formula:

$$R_A = f(P) = \begin{cases} 20, & P \geq 60\% \\ 10, & P < 60\% \\ 5, & P < 30\% \end{cases} \quad (1)$$

Where $R_A$ is the emergency beacon transmission rate, P is the remaining battery power.

It should be noted that the specific example of beacon transmission rates above are merely one example implementation. In the various aspects of the present disclosure, the actual transmission rate may be configurable for each discrete power state. Accordingly, various aspects of the present disclosure may implement any number of different configuration transmission rates based on the power state of the mobile device.

While mobile device 102a may reduce its transmission rate for emergency beacons, access point 104 may maintain the same rate of forwarding the various emergency messages and beacons from emergency mesh network 107. Access point 104 is attached to a non-battery power source and, therefore, will not suffer from the same power conservation considerations as mobile devices 102a-e. Accordingly, access point 104 may be a preferred relay node for traffic in emergency mesh network 107.

Figure 1C:
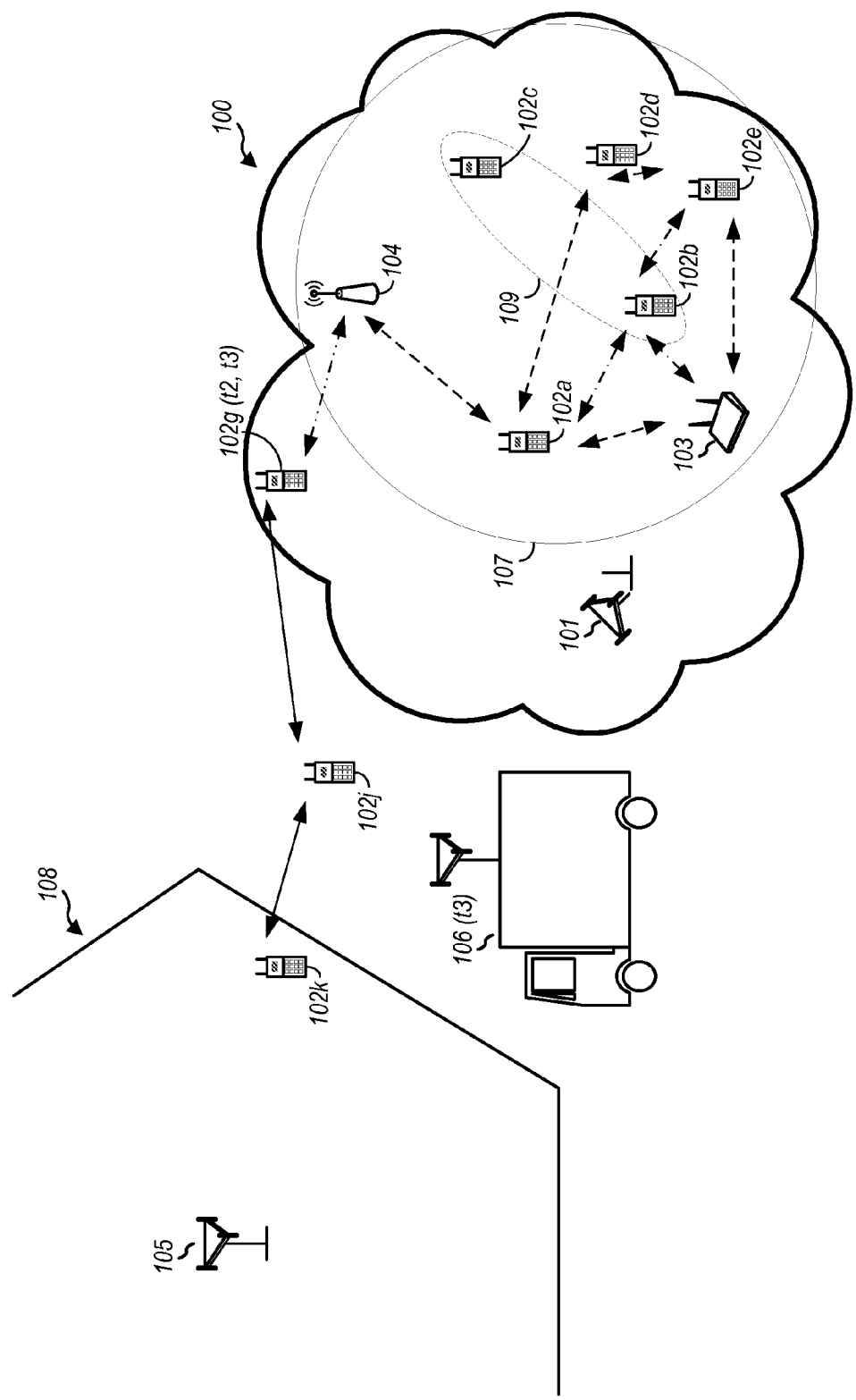

FIG. 1C is a block diagram illustrating the example communications system at a time, t3, after the emergency event. At time, t3, an emergency-related rapid response mobile communications apparatus 106, such as a COLT or a COW, has arrived to the location near the emergency zone 100. Mobile communications apparatus 106 will provide additional capacity and, perhaps, make up for the capacity lost due to the inoperability of base station 101. Emergency mesh network 107 has been able to maintain the emergency messages and beacons from mobile devices 102a-e, from the time of the emergency event to time, t3. During this time mobile device 102c has run out of battery power. Therefore, communications from mobile device 102c have ceased. However, because emergency mesh network 107 provides for store and forward of the transmitted messages and beacons, the messages and beacons transmitted from mobile device 102c are still circulating within the remaining nodes of emergency mesh network 107. Thus, if the emergency messages are transmitted via WLAN through mobile devices 102g, j, and k, or via WWAN through connection of mobile devices 102a, b, g, j, or k, the information associated with mobile device 102c may still be relayed to the appropriate emergency services.

Various aspects of the present disclosure further allow for the nodes within emergency mesh network 107 to selectively choose which radio interface to use in its transmissions in order to further conserve power. For example, at time, t3, mobile device 102e may transmit its messages to WIFI™ access point 103 via WIFI™, to mobile devices 102b and d via BLUETOOTH™ or WIFI™, and potentially to mobile communications apparatus 106 via WWLAN. When determining routing decisions, mobile device 102e may consider which radio technology interface to use when transmitting its messages. In transmitting emergency messages or beacons to mobile device 102b, which is in the lower-power domain 109, mobile device 102e could transmit via either WIFI™ or BLUETOOTH™. However, because BLUETOOTH™ generally uses less power than WIFI™, mobile device 102e would select to transmit messages to mobile device 102b using its BLUETOOTH™ radio. Similarly, if mobile device 102e desired to conserve its own power as well, it may also select to transmit emergency messages and beacons using its BLUETOOTH™ radios. If the remaining power supply for mobile device 102e is reaching a lower state, it may select only to make BLUETOOTH™ transmissions, thus, ceasing any new messages to WIFI™ access point 103.

Various additional or alternative aspects of the present disclosure would allow user input to affect the transmission route selection process. With reference to FIG. 1C, at time, t3, the emergency-related rapid response mobile communications apparatus 106 has arrived and other emergency-related responders are also arriving to rescue the victims in emergency zone 100. As victims are near to being reached by emergency responders, the victim/user may provide input to his or her mobile device that directs more emergency messages to be transmitted or routed through the mobile device. For example, if the user of mobile device 102a knows that emergency responders are near, he or she may provide input to mobile device 102a that identifies and transmits routing override messages to the other mobile devices 102b-e, WIFI™ access point 103, and access point 104 to route as many emergency messages as possible to mobile device 102a. Thus, as the emergency responders reach the victim/user of mobile device 102a, information on the other victims may be readily available to the emergency responders. The routing override messages temporarily override any of the routing mechanisms based on power profile and, instead, simply route as directly as possible to the transmitting mobile device, mobile device 102a. After a certain period of time, which may be tracked by an override clock or other such mechanism, the other mobile devices 102b-e will return to the power profile-based routing scheme to conserve power.

Figure 2:
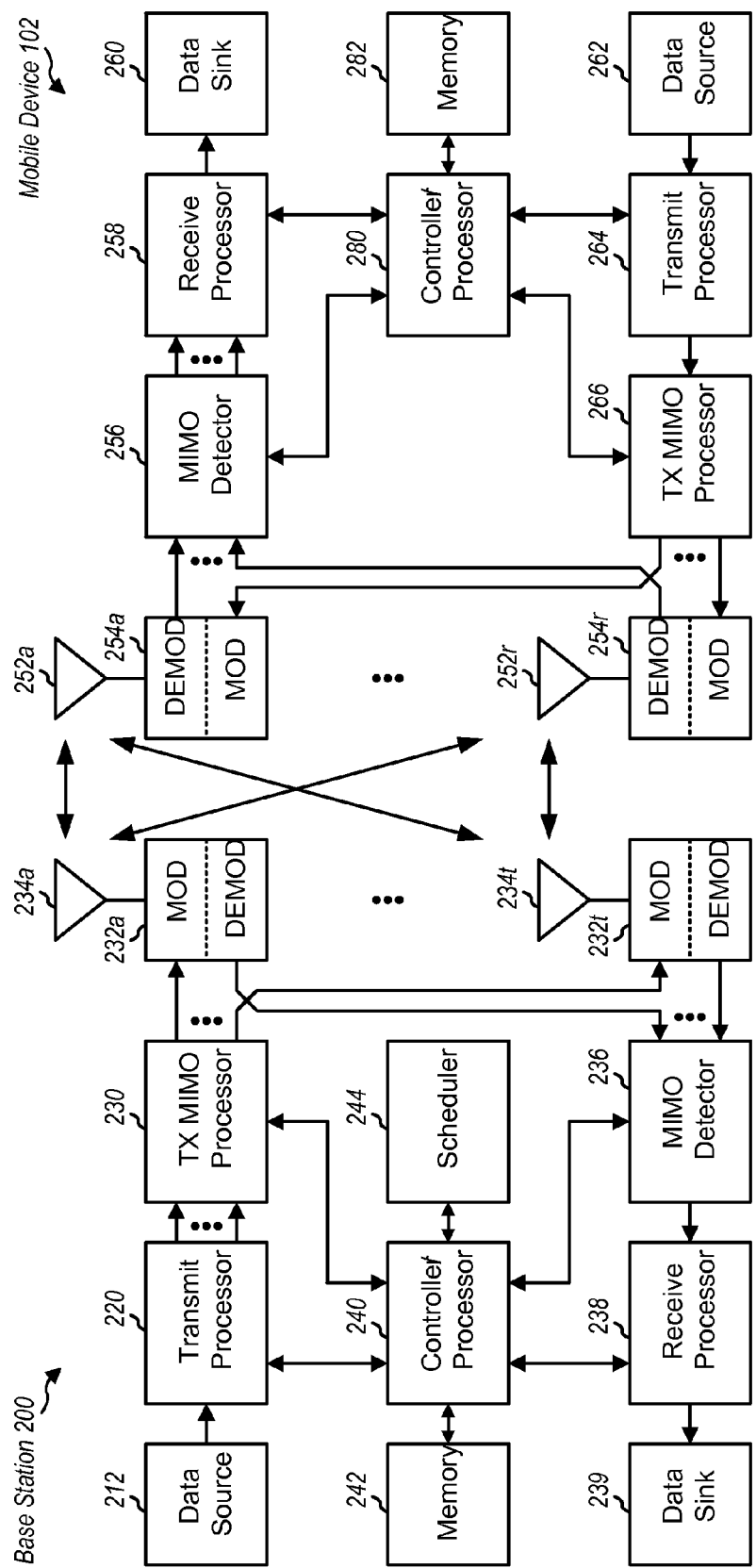
FIG. 2 shows a block diagram of a design of a base station and a mobile device, which may be one of the base stations and one of the mobile devices in FIGS. 1A-1C.

FIG. 2 shows a block diagram of a design of a base station 200 and a mobile device 102, which may be one of the base stations and one of the mobile devices in FIGS. 1A-1C. The base station 200 may be equipped with antennas 234a through 234t, and the mobile device 102 may be equipped with antennas 252a through 252r.

At the base station 200, a transmit processor 220 may receive data from a data source 212 and control information from a controller/processor 240. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the mobile device 102, the antennas 252a through 252r may receive the downlink signals from the base station 200 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the mobile device 102 to a data sink 260, and provide decoded control information to a controller/processor 280.

On the uplink, at the mobile device 102, a transmit processor 264 may receive and process data from a data source 262 and control information from the controller/processor 280. The transmit processor 264 may also generate reference symbols for a reference signal. The symbols from the transmit processor 264 may be precoded by a TX MIMO processor 266 if applicable, further processed by the demodulators 254a through 254r, and transmitted to the base station 200. At the base station 200, the uplink signals from the mobile device 102 may be received by the antennas 234, processed by the modulators 232, detected by a MIMO detector 236 if applicable, and further processed by a receive processor 238 to obtain decoded data and control information sent by the mobile device 102. The processor 238 may provide the decoded data to a data sink 239 and the decoded control information to the controller/processor 240.

The controllers/processors 240 and 280 may direct the operation at the base station 200 and the mobile device 102, respectively. The controller/processor 240 and/or other processors and modules at the base station 200 may perform or direct the execution of various processes for the techniques described herein. The controllers/processor 280 and/or other processors and modules at the mobile device 102 may also perform or direct the execution of the functional blocks illustrated in FIG. 3, and/or other processes for the techniques described herein. The memories 242 and 282 may store data and program codes for the base station 200 and the mobile device 102, respectively. A scheduler 244 may schedule mobile devices for data transmission on the downlink and/or uplink.

Figure 3:
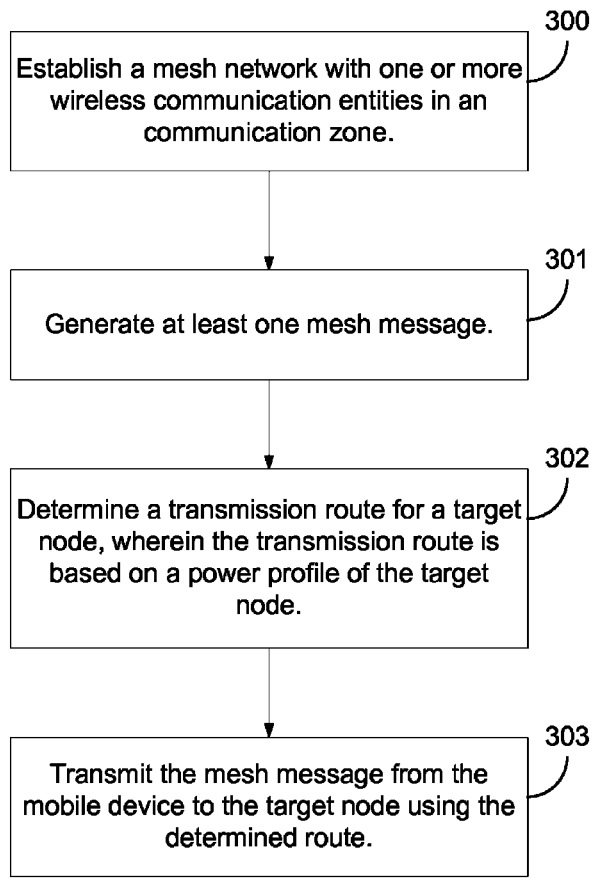
FIG. 3 is a functional block diagram illustrating example blocks executed to implement one aspect of the present disclosure.

Turning now to FIG. 3, a functional block diagram is illustrated showing example blocks executed to implement one aspect of the present disclosure. While emergency communication situations provide one example implementation of various aspects of the present disclosure, additional aspects of the present disclosure may be applied in non-emergency situations, in which power conservation goals suggest formation of such mesh networks, such as forming a mesh network in specific communication zone, such as an office building or shopping center for tenants or visitors with mobile devices. Additional applications may exist for network offloading techniques or in proximity-based applications, such as games, social media applications, recommendation applications, and the like. In block 300, a mesh network is established with one or more wireless communication entities in a communication zone. Wireless communication entities may include mobile devices, access points, relays, and the like. At least one mesh message is generated in block 301. The mobile device determines a transmission route, in block 302, for a target node of the wireless communication entities in the mesh network, where the transmission route is determined based on a power profile of the target node. In block 303, the mesh message is transmitted from the mobile device to the target node using the determined transmission route.

Figure 4:
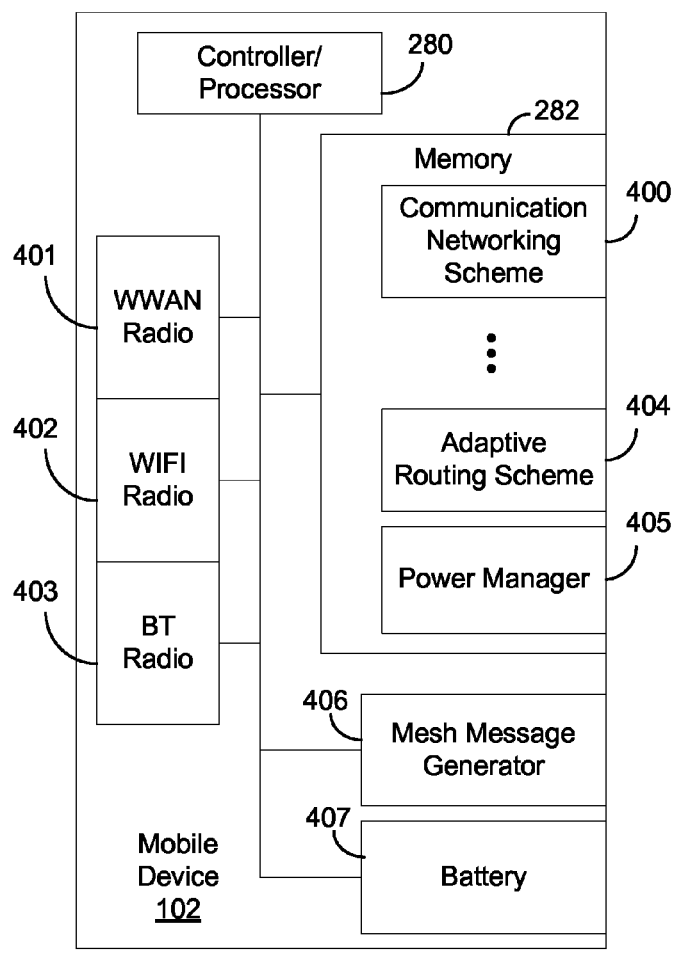
FIG. 4 is a block diagram illustrating a mobile device configured according to one aspect of the present disclosure.

FIG. 4 is a block diagram illustrating a mobile device 102 configured according to one aspect of the present disclosure. Mobile device 102 includes controller/processor 280 that controls the various components and executes any software or firmware that is used to operate the functionality and features of mobile device 102. When a facility for forming a mesh network is detected, controller/processor 280 accesses memory 282 to run the communication networking scheme 400. Under control of controller/processor 280, the communication networking scheme transmits peer-to-peer connection messages to one or more neighboring devices using any of WWAN radio 401, WIFI™ radio 402, and BLUETOOTH™ (BT) radio 403. Connection messages are also received over these radios and used to establish a mesh network with the available neighboring devices. The combination of these components and acts provides means for establishing a mesh network with one or more wireless communication entities in a communication zone.

While in a mesh communication mode, mesh messages and beacons are generated by mesh message generator 406, under control of controller/processor 280, using various data and information stored in memory 282 or derivable under control of controller/processor 280. The combination of these components and acts provides means for generating at least one mesh message.

Controller/processor 280 accesses memory 282 to execute adaptive routing scheme 404. The adaptive routing scheme 404 determines the route that mobile device 102 will transmit. As a part of the communication signals received from the other nodes in the mesh network, the power profile of the node is included. The power profile can be any number of different measurements or metrics that reflect the available power or power efficiency of the node. For example, the power profile may be the remaining battery power, the power to transmit a single message, etc., or any combination of such parameters. The adaptive routing scheme 404 uses the power profile for various target nodes considered for transmission and determines the edge route based on this power profile information. The combination of these components and acts provides means for determining a transmission route for a target node of the one or more wireless communication entities, wherein the transmission route is determined based on a power profile of the target node.

Once the transmission route has been selected, the controller/processor 280 transmits the mesh message over the selected one of WWAN radio 401, WIFI™ radio 402, and BT radio 403. The combination of these components and acts provides means for transmitting the at least one mesh message from the mobile device to the target node using the determined transmission route.

Mobile device 102 may also evaluate its own power profile for signals to be transmitted to the other nodes in the mesh network and also to determine other transmission characteristics, such as mesh beacon transmission frequency, radio selection, store and forward behavior, and the like. Under control of the controller/processor 280, power management code 405 is executed which analyzes the power remaining in battery 407 and also the power required for transmission over any of WWAN radio 401, WIFI™ radio 402, and BT radio 403.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 3 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   establishing a mesh network with one or more wireless communication entities in a communication zone of a wireless communication network;
   generating, at a mobile device, at least one mesh message;
   determining, by the mobile device, a transmission route for a target node of the one or more wireless communication entities, wherein the transmission route is determined based on a power profile of the target node;
   transmitting the at least one mesh message from the mobile device to the target node using the determined transmission route;

receiving, at the mobile device, an external mesh message from at least one of the one or more wireless communication entities;
determining a local power profile of the mobile device; and
in response to the local power profile failing to exceed a threshold value:
   determining a priority of the external mesh message;
   performing storing and forwarding-in response to the priority exceeding a priority threshold, including:
      storing the external mesh message; and
      forwarding the external mesh message according to the determining the transmission route and transmitting; and
   dropping the external mesh message when the priority fails to exceed the priority threshold.

2. The method of claim 1, further comprising:
performing the storing and forwarding-in response to the local power profile exceeding the threshold value.

3. The method of claim 2, further comprising:
retransmitting the at least one mesh message at a modified transmission rate, wherein the modified transmission rate varies according to the local power profile.

4. The method of claim 3, further comprising:
retransmitting the at least one mesh message at a modified transmission rate, wherein the modified transmission rate varies according to a priority of the at least one mesh message.

5. The method of claim 2, further comprising:
selecting one of a plurality of radio interfaces for the transmitting, wherein the selecting is based on the local power profile.

6. The method of claim 2, further comprising:
receiving input from a user of the mobile device identifying a transmission route override message;
transmitting the transmission route override message to each of the one or more wireless communication entities within the mesh network; and
in response to the identified transmission route override message, overriding the determined local power profile, wherein the storing and forwarding are performed without regard to the local power profile.

7. The method of claim 1, further comprising:
detecting one or more new target nodes entering the mesh network;
identifying a new power profile for each of the one or more new target nodes; and
updating the transmission route based on the new power profile.

8. The method of claim 1, further comprising:
detecting one or more new target nodes entering the mesh network;
identifying a new power profile for each of the one or more new target nodes; and
periodically updating the transmission route based on the new power profile.

9. The method of claim 1, further comprising:
detecting an availability of the one or more wireless communication entities; and
wherein the determining the transmission route is further based on the availability of the target node.

10. The method of claim 1, further comprising:
detecting a change in power characteristics at the mobile device; and
updating a local power profile of the mobile device in response to the detected change.

11. The method of claim 10, wherein the updating the local power profile is performed only when the mobile device is in an active mode.

12. The method of claim 1, further comprising:
detecting, by the mobile device, message traffic at the target node; and
selecting a new transmission route using a new target node of the one or more wireless communication entities in response to the message traffic exceeding a threshold.

13. The method of claim 12, wherein the detecting comprises:
receiving an overload message broadcast from the target node.

14. The method of claim 1, further comprising
selecting one of a plurality of radio interfaces for the transmitting, wherein the selecting is based on the power profile of the target node.

15. The method of claim 1, further comprising:
grouping the one or more wireless communication entities into a plurality of domains, wherein each domain corresponds to a range of power profiles associated with the one or more wireless communication entities.

16. The method of claim 15, wherein the determining comprises:
determining the transmission route for a target domain in which the target node resides, wherein the determination is based on a domain health of the target domain.

17. The method of claim 16, wherein the domain health comprises one or more of:
an average power profile of the one or more wireless communication entities in the target domain;
an average remaining power of the one or more wireless communication entities in the target domain;
an average power consumed by the one or more wireless communication entities in the target domain to transmit a single message;
an intra-domain connectivity;
an inter-domain connectivity; and
one or more radio interfaces of the one or more wireless communication entities in the mesh network.

18. The method of claim 17, wherein the wireless communication networks comprises one or more of:
the Internet; and
a wide area network (WAN).

19. The method of claim 1, wherein the power profile is determined based on one or more of:
remaining battery power;
average power consumed in routing the mesh message;
available radio interfaces for transmission;
a bandwidth of the available radio interfaces for transmission;
power characteristics of the available radio interfaces for transmission;
proximity of the target node; and
size of the mesh message.

20. The method of claim 1, further comprising:
receiving a routing override message, wherein the routing override message overrides the determining based on the power profile of the target node, and creates the determined transmission route based on the routing override message.

21. The method of claim 20, wherein the routing override message originates from one of:
a user; and
the wireless communication network.

22. A method of wireless communication, comprising:
 establishing a mesh network with one or more wireless communication entities in a communication zone of a wireless communication network;
 generating, at a mobile device, at least one mesh message;
 determining, by the mobile device, a transmission route for a target node of the one or more wireless communication entities, wherein the transmission route is determined based on a power profile of the target node;
 transmitting the at least one mesh message from the mobile device to the target node using the determined transmission route;
 determining power profiles of at least two potential target nodes of the one or more wireless communication entities to be equivalent; and
 wherein the determining of the transmission route comprises:
  selecting one of the at least two potential target nodes having the equivalent power profiles.

23. The method of claim 22, wherein the selecting comprises one of:
 randomly selecting one of the at least two potential target nodes;
 sequentially selecting one of the at least two potential target nodes according to a round-robin selection scheme; and
 selecting one of the at least two potential target nodes according to a weight based, at least in part, on the power profile of each neighbor node of the at least two potential target nodes.

24. A computer program product comprising:
 a non-transitory computer-readable medium including:
  code to establish a mesh network with one or more wireless communication entities in a communication zone of a wireless communication network;
  code to generate, at a mobile device, at least one mesh message;
  code to determine, by the mobile device, a transmission route for a target node of the one or more wireless communication entities, wherein the transmission route is determined based on a power profile of the target node;
  code to transmit the at least one mesh message from the mobile device to the target node using the determined transmission route;
  code to receive, at the mobile device, an external mesh message from at least one of the one or more wireless communication entities;
  code to determine a local power profile of the mobile device; and
  code, executable in response to the local power profile failing to exceed a threshold value:
   to determine a priority of the external mesh message;
   to execute code to store and code to forward in response to the priority exceeding a priority threshold, including:
    code to store the external mesh message; and
    code to forward the external mesh message according to the code to determine the transmission route and transmit; and
   to drop the external mesh message when the priority fails to exceed the priority threshold.

25. The computer program product of claim 24, further comprising:
 code, executable in response to the local power profile exceeding a threshold value, to execute the code to store and the code to forward.

26. The computer program product of claim 25, further comprising:
 code to retransmit the at least one mesh message at a modified transmission rate, wherein the modified transmission rate varies according to the local power profile.

27. The computer program product of claim 26, further comprising:
 code to retransmit the at least one mesh message at a modified transmission rate, wherein the modified transmission rate varies according to a priority of the at least one mesh message.

28. The computer program product of claim 25, further comprising:
 code to select one of a plurality of radio interfaces for the code to transmit, wherein the code to select is based on the local power profile.

29. The computer program product of claim 25, further comprising:
 code to receive input from a user of the mobile device identifying a transmission route override message;
 code to transmit the transmission route override message to each of the one or more wireless communication entities within the mesh network; and
 code, executable in response to the identified transmission route override message, to override the determined local power profile, wherein the code to store and code to forward are executed without regard to the local power profile.

30. The computer program product of claim 24, further comprising:
 code to detect one or more new target nodes entering the mesh network;
 code to identify a new power profile for each of the one or more new target nodes; and
 code to update the transmission route based on the new power profile.

31. The computer program product of claim 24, further comprising:
 code to detect one or more new target nodes entering the mesh network;
 code to identify a new power profile for each of the one or more new target nodes; and
 code to periodically update the transmission route based on the new power profile.

32. The computer program product of claim 24, further comprising:
 code to detect an availability of the one or more wireless communication entities; and
 wherein the code to determine the transmission route is further based on the availability of the target node.

33. The computer program product of claim 24, further comprising:
 code to detect a change in power characteristics at the mobile device; and
 code to update a local power profile of the mobile device in response to the detected change.

34. The computer program product of claim 33, wherein the code to update the local power profile is performed only when the mobile device is in an active mode.

35. The computer program product of claim 24, further comprising:
 code to detect, by the mobile device, message traffic at the target node; and
 code to select a new transmission route using a new target node of the one or more wireless communication entities in response to the message traffic exceeding a threshold.

36. The computer program product of claim 35, wherein the code to detect comprises:
   code to receive an overload message broadcast from the target node.

37. The computer program product of claim 24, further comprising
   code to select one of a plurality of radio interfaces for the transmitting, wherein the code to select is based on the power profile of the target node.

38. The computer program product of claim 24, further comprising:
   code to group the one or more wireless communication entities into a plurality of domains, wherein each domain corresponds to a range of power profiles associated with the one or more wireless communication entities.

39. The computer program product of claim 38, wherein the code to determine comprises:
   code to determine the transmission route for a target domain in which the target node resides, wherein the determination is based on a domain health of the target domain.

40. The computer program product of claim 39, wherein the domain health comprises one or more of:
   an average power profile of the one or more wireless communication entities in the target domain;
   an average remaining power of the one or more wireless communication entities in the target domain;
   an average power consumed by the one or more wireless communication entities in the target domain to transmit a single message;
   an intra-domain connectivity;
   an inter-domain connectivity; and
   one or more radio interfaces of the one or more wireless communication entities in the mesh network.

41. The computer program product of claim 40, wherein the wireless communication network comprises one or more of:
   the Internet; and
   a wide area network (WAN).

42. The computer program product of claim 24, wherein the power profile is determined based on one or more of:
   remaining battery power;
   average power consumed in routing the mesh message;
   available radio interfaces for transmission;
   a bandwidth of the available radio interfaces for transmission;
   power characteristics of the available radio interfaces for transmission;
   proximity of the target node; and
   size of the mesh message.

43. The computer-program product of claim 24, further comprising:
   code to receive a routing override message, wherein the routing override message overrides the code to determine based on the power profile of the target node, and creates the determined transmission route based on the routing override message.

44. The computer-program product of claim 43, wherein the routing override message originates from one of:
   a user; and
   the wireless communication network.

45. A computer program product comprising:
   a non-transitory computer-readable medium including:
      code to establish a mesh network with one or more wireless communication entities in a communication zone of a wireless communication network;
      code to generate, at a mobile device, at least one mesh message;
      code to determine, by the mobile device, a transmission route for a target node of the one or more wireless communication entities, wherein the transmission route is determined based on a power profile of the target node;
      code to transmit the at least one mesh message from the mobile device to the target node using the determined transmission route; and
      code to determine power profiles of at least two potential target nodes of the one or more wireless communication entities to be equivalent; and
      wherein the code to determine the transmission route includes:
         code to select one of the at least two potential target nodes having the equivalent power profiles.

46. The computer program product of claim 45, wherein the code to select comprises one of:
   code to randomly select one of the at least two potential target nodes;
   code to sequentially select one of the at least two potential target nodes according to a round-robin selection scheme; and
   code to select one of the at least two potential target nodes according to a weight based, at least in part, on the power profile of each neighbor node of the at least two potential target nodes.

47. An apparatus for wireless communication, comprising:
   means for establishing a mesh network with one or more wireless communication entities in a communication zone of a wireless communication network;
   means for generating, at a mobile device, at least one mesh message;
   means for determining, by the mobile device, a transmission route for a target node of the one or more wireless communication entities, wherein the transmission route is determined based on a power profile of the target node that indicates power consumed in routing the mesh message;
   means for transmitting the at least one mesh message from the mobile device to the target node using the determined transmission route;
   means for receiving, at the mobile device, an external mesh message from at least one of the one or more wireless communication entities;
   means for determining a local power profile of the mobile device; and
   responsive to the local power profile failing to exceed a threshold value:
      means for determining a priority of the external mesh message;
      means for performing storing and forwarding-in response to the priority exceeding a priority threshold, including:
         means for storing the external mesh message; and
         means for forwarding the external mesh message according to the means for determining the transmission route and means for transmitting; and
      means for dropping the external mesh message when the priority fails to exceed the priority threshold.

48. An apparatus for wireless communication, comprising:
   at least one processor; and
   a memory coupled to said at least one processor, wherein said at least one processor is configured to:

establish a mesh network with one or more wireless communication entities in a communication zone of a wireless communication network;
generate at least one mesh message;
determine a transmission route for a target node of the one or more wireless communication entities, wherein the transmission route is determined based on a power profile of the target node that indicates power consumed in routing the mesh message;
transmit the at least one mesh message from the apparatus to the target node using the determined transmission route;
receive, at a mobile device, an external mesh message from at least one of the one or more wireless communication entities;
determine a local power profile of the mobile device; and
in response to the local power profile failing to exceed a threshold value:
  determine a priority of the external mesh message;
  perform storing and forwarding-in response to the priority exceeding a priority threshold, including:
    storing the external mesh message; and
    forwarding the external mesh message according to the determining the transmission route and transmitting; and
  drop the external mesh message when the priority fails to exceed the priority threshold.

\* \* \* \* \*